United States Patent
Johnson

(10) Patent No.: US 6,963,063 B2
(45) Date of Patent: Nov. 8, 2005

(54) USE OF NON-INTERDIGITATED COMMUTATION SENSORS ON OPTO-ASICS TO ACHIEVE LOW CPR NON-STANDARD ENCODER RESOLUTIONS

(75) Inventor: Paul Marvin Johnson, Santa Barbara, CA (US)

(73) Assignee: Renco Encoders Inc., Goleta, CA (US)

( * ) Notice: Subject to any disclaimer, the term of this patent is extended or adjusted under 35 U.S.C. 154(b) by 101 days.

(21) Appl. No.: 10/443,483

(22) Filed: May 22, 2003

(65) Prior Publication Data

US 2004/0232319 A1 Nov. 25, 2004

(51) Int. Cl.[7] ............................. G01D 5/34; G01J 9/00
(52) U.S. Cl. ....................... 250/231.13; 250/231.14; 250/237 R; 341/13
(58) Field of Search ................. 250/231.13–231.18, 250/237 R; 356/614, 616–617; 341/11, 13, 341/31

(56) References Cited

U.S. PATENT DOCUMENTS

| | | | | |
|---|---|---|---|---|
| 4,184,071 A | * | 1/1980 | Fryer et al. ............ | 250/231.16 |
| 4,731,542 A | * | 3/1988 | Doggett ................... | 250/548 |
| 5,047,631 A | * | 9/1991 | Frese ...................... | 250/237 G |
| 5,128,536 A | * | 7/1992 | Higashi ................... | 250/231.16 |
| 5,917,182 A | * | 6/1999 | Ishizuka ................. | 250/237 G |
| 5,936,236 A | * | 8/1999 | Setbacken et al. ..... | 250/231.13 |
| 5,998,784 A | * | 12/1999 | Venugopal et al. .... | 250/231.13 |

* cited by examiner

Primary Examiner—David Porta
Assistant Examiner—Suezu Ellis
(74) Attorney, Agent, or Firm—Brinks Hofer Gilson & Lione

(57) ABSTRACT

A scale for a position encoder that includes a first graduation track having a first set of markings that are periodically arranged with a defined graduation period Δ, a second graduation track having a second set of markings that are periodically arranged with a defined graduation period Δ, wherein the second graduation track is shifted relative to the first graduation track by a distance Δ/4. A third graduation track having a third set of markings that are periodically arranged with a defined graduation period Δ, wherein the first, second and third graduation tracks are positioned such that at any one time at least one, but never three, of the first, second and third graduation tracks will transmit light directed upon the scale.

17 Claims, 6 Drawing Sheets

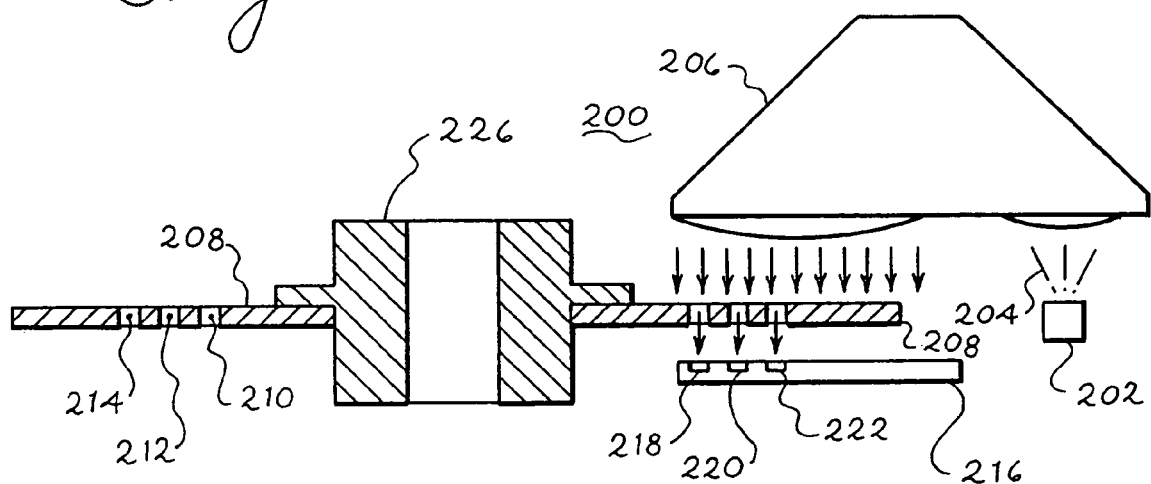
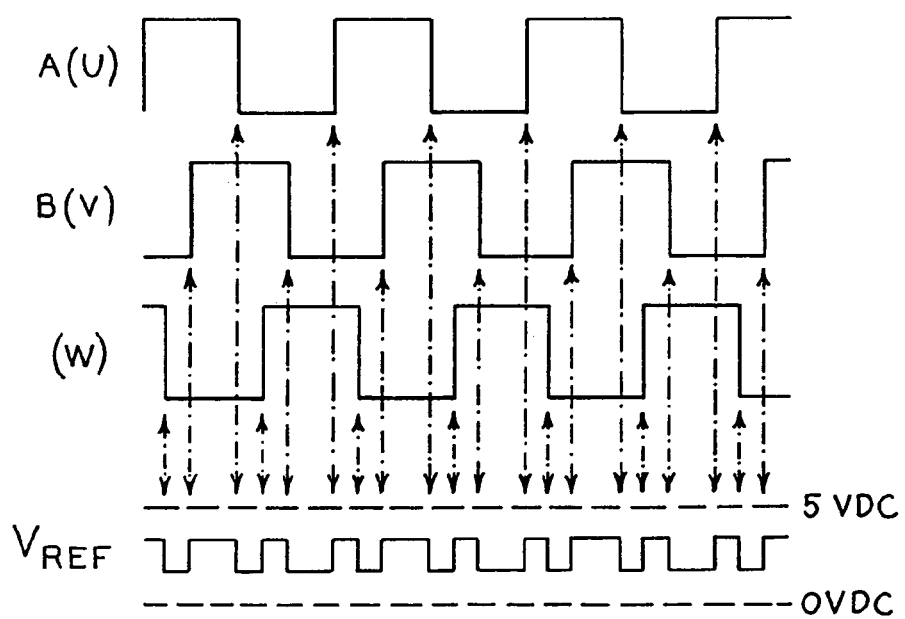

USE OF NON-INTERDIGITATED COMMUTATION SENSORS ON OPTO-ASICS TO ACHIEVE LOW CPR NON-STANDARD ENCODER RESOLUTIONS

BACKGROUND OF THE INVENTION

1. Field of the Invention

The present invention relates to position measuring devices that generate quadrature data signals, for the purpose of position and/or speed control of various devices, using optical sensors, for example.

2. Discussion of Related Art

As shown in FIG. 1, it is known to couple a position measuring device, such as an angle encoder 10, to a motor 12, such as a brushless motor, as described in U.S. Pat. No. 5,936,236, the entire contents of which are incorporated herein by reference. The angle encoder 10 includes a scale 14, a hub 16 and a scanning unit 18. The hub 16 is coupled to the motor 12 via a shaft 20 so as the motor 12 rotates, so does the scale 14. The encoder is used to encode the commutation of the motor. The scale 14 has three graduation tracks 22, 24, 26 disposed thereon. The angle encoder is an optical encoder and graduation tracks 22, 24, 26 are formed by opaque and light transmissive areas sequentially arranged. The scanning unit 18 includes a plurality of scanning elements that scan the graduation track 22, 24 and 26.

The scanning unit 18 outputs three analog scanning signals $S1_A$, $S2_A$, $S3_A$. These analog signals are input to a comparison unit 28 where they are converted to digital signals. For commutation signals each of the scanning signals are converted into a digital signal that can be synchronized with the relative position of the motor's windings. In addition, the outputs of the comparison unit 28 are sent to the motor 12 through a drive circuit 30. Position commands are generated by a controller 32 which acts upon measurements made by a feedback device 34.

One disadvantage of the position measuring device of FIG. 1 is that in the case where the circuitry includes a data array of a standard Opto-ASIC, the encoder resolutions available for data output signals are limited to those scales that have a count that closely matches the design of the array. Therefore, only certain counts can be provided. The only way for providing a user with a custom count is to design a new ASIC for that particular count.

Another disadvantage of the measuring device of FIG. 1 is that the commutation circuitry generates signals that are suitable only for the control of the commutation of electrical brushless motors. This type of signal is not suitable for data applications. Therefore, the commutation portion of the device cannot be used to generate custom count data signals using the standard scale.

OBJECT AND SUMMARY OF THE INVENTION

One aspect of the present invention regards a position encoder that includes a scale that has a first graduation track with a first set of markings that are periodically arranged with a defined graduation period $\Delta$, a second graduation track having a second set of markings that are periodically arranged with a defined graduation period $\Delta$, wherein the second graduation track is shifted relative to the first graduation track by a distance $\Delta/4$. A third graduation track having a third set of markings that are periodically arranged with a defined graduation period $\Delta$, wherein the first, second and third graduation tracks are positioned such that at any one time at least one, but never three, of the first, second and third graduation tracks will transmit light directed upon the scale. A scanning unit that is displaced relative to the scale, the scanning unit having a first sensor that scans the first graduation track and generates a first scanning signal, a second sensor that scans the second graduation track and generates a second scanning signal and a third sensor that scans the third graduation track and generates a third scanning signal. A circuit that generates quadrature signals based on the first and second scanning signals.

A second aspect of the present invention regards a scale for a position encoder that includes a first graduation track having a first set of markings that are periodically arranged with a defined graduation period $\Delta$, a second graduation track having a second set of markings that are periodically arranged with a defined graduation period $\Delta$, wherein the second graduation track is shifted relative to the first graduation track by a distance $\Delta/4$. A third graduation track having a third set of markings that are periodically arranged with a defined graduation period $\Delta$, wherein the first, second and third graduation tracks are positioned such that at any one time at least one, but never three, of the first, second and third graduation tracks will transmit light directed upon the scale.

A third aspect of the invention regards a method of manufacturing a position encoder by providing an initial position encoder with a first scale, wherein the initial position encoder generates commutation signals and replacing the first scale with a second scale resulting in an altered position encoder, wherein the altered position encoder generates quadrature signals.

Each aspect of the present invention provides the advantage of allowing for custom counts (generally below 250 counts per rotation) by taking advantage of known commutation circuitry and disregarding the data circuitry.

Further advantages, as well as details of the present invention ensue from the subsequent description of exemplary embodiments by the attached drawings.

BRIEF DESCRIPTION OF THE DRAWINGS

FIG. 2 schematically shows a side cross-sectional view of an embodiment of a position measuring device in accordance with the present invention;

FIG. 7 shows signal diagrams for the position measuring device of FIG. 2.

DETAILED DESCRIPTION OF THE PREFERRED EMBODIMENTS

Figure 1:
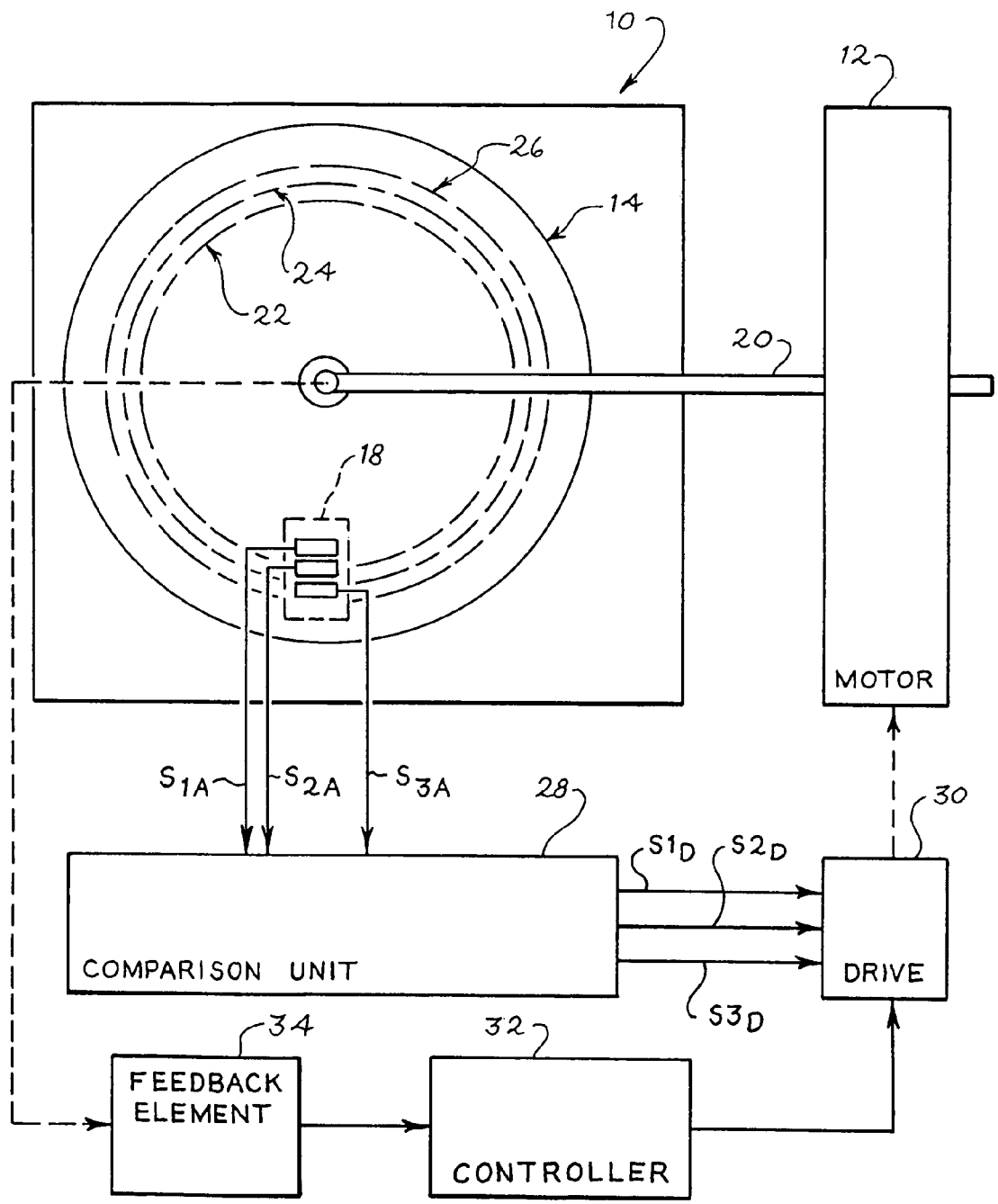
FIG. 1 schematically shows a known embodiment of a position measuring device.

An embodiment of a position measuring device in accordance with the present invention is shown in FIGS. 2–6. As shown in FIG. 2, the position measuring device, such as angle encoder 200, includes a light source, such as an infrared light emitting diode (LED) 202, which generates non-collimated light 204 that is directed to a prism lens 206. The light 204 is then redirected by the prism lens 206 and exits the prism lens 206 via an output lens so that the light is collimated and falls onto a scale 208.

As shown in FIGS. 2–5, the scale 208 is in the form of a metal disc that has three graduation tracks 210, 212 and 214. Each of the graduation tracks are formed by opaque and transmissive areas sequentially arranged. The collimated light from the prism lens 206 is transmitted through the transmissive areas of the three graduation tracks and is detected by an Opto ASIC scanning unit 216 that includes commutation sensors 218, 220, 222 that correspond to the graduation tracks.

Figure 3:
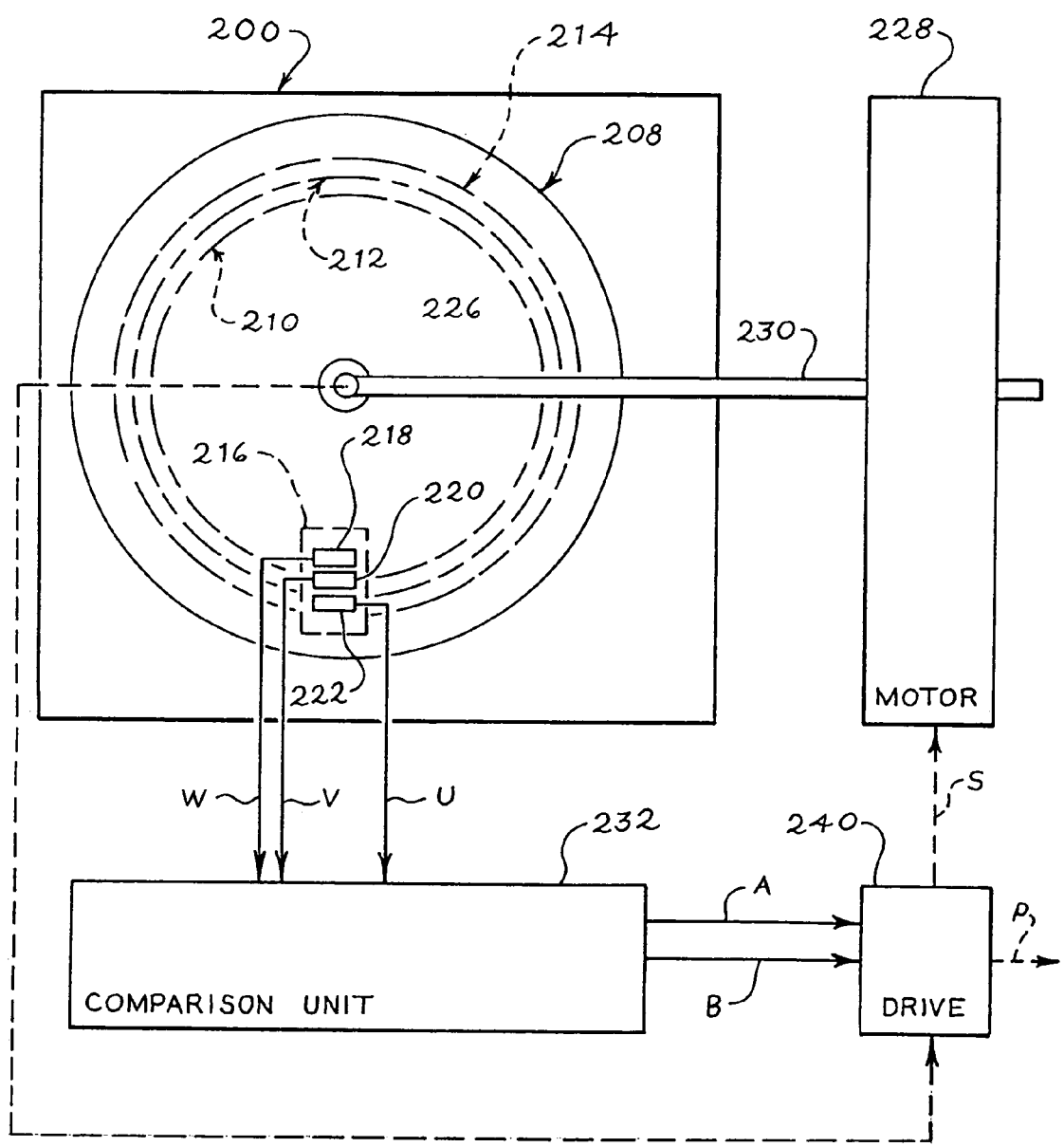
FIG. 3 schematically shows the position measuring device of FIG. 2.

As shown in FIGS. 2 and 3, the scale 208 is connected to a hub 226, which is coupled to a motor 228, such as a brushless motor, via a shaft 230. In operation, when the motor 228 is on, the shaft 230 and scale 208 are rotated in unison. As the scale 208 is rotated, the light from the LED 202 is transmitted through the three graduation tracks 210, 212 and 214 of the scale 208 and are detected by the corresponding commutation sensors 218, 220 and 222 of the scanning unit 216. Note that the commutation sensors 218, 220 and 222 are optically sensitive portions of the Opto ASIC scanning unit 216 that are positioned directly under corresponding graduation tracks 210, 212 and 214, respectively.

Each of the three commutation sensors 218, 220 and 222 generates a corresponding signal. In particular, the sensor 222 that scans the outer ring of graduation tracks 214 generates a commutation signal U that is later formed as a data channel A output signal A. Similarly, the sensor 220 that scans the middle ring of graduation tracks 212 generates a commutation signal V that is used as a data channel B output signal B. The sensor 218 that scans the inner ring of graduation tracks 210 generates a commutation signal W. As will be described below, the data channel output signals A and B can be made to produce the standard quadrature signals normally found in a position encoder with proper design of the graduation track patterns of scale 208. In addition, the W commutation channel must be used in such a way as to make the reference voltage perform as required.

Figure 6:
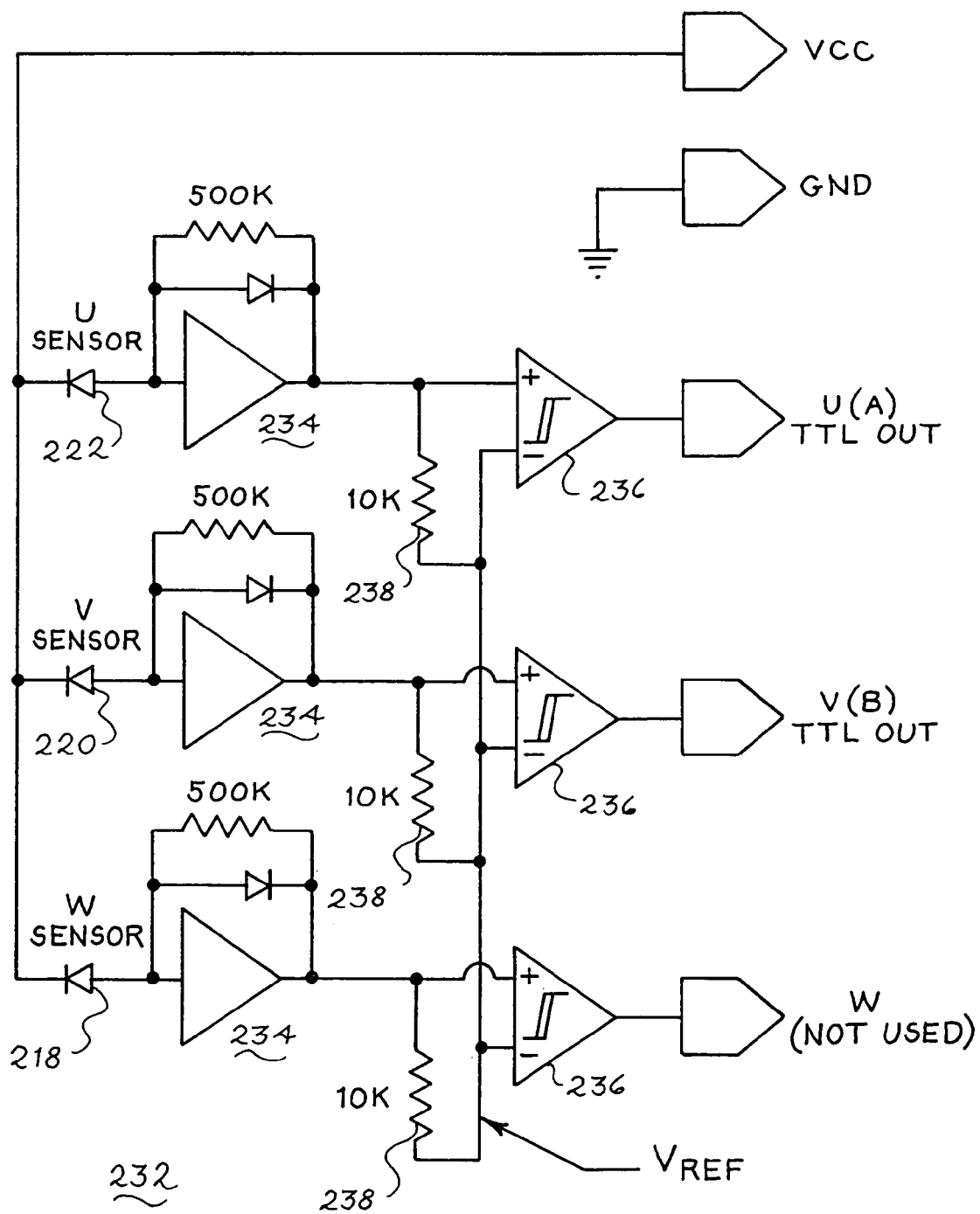
FIG. 6 schematically shows an embodiment of a comparison circuit to be used with the position measuring device of FIG. 2.

As shown in FIGS. 3 and 6, the commutation signals U, V, W are sent to a comparison unit 232. The comparison unit 232 includes a circuit that is well known in the art and is designed so that each of the commutation signals U, V, W passes through an amplifier 234 and then a comparator 236. Note that the via 10K resistors 238, a reference voltage $V_{REF}$ is created from the composite signal formed from the outputs of the sensors 218, 220 and 222 as shown in FIG. 7. This reference voltage $V_{REF}$ is connected to the minus (−) pin of each comparator 236. This technique of using the average voltage of three signals is well known in the art. As shown in FIGS. 3 and 6, the comparison unit 232 generates two data signals A and B while the signal W is not used externally of the comparison unit 232.

The outputs of the comparison unit 232 are sent to the motor 228 via a suitable feedback control device 240 that is capable of receiving standard quadrature data signals A and B, the generation of which will be explained below. Rotational commands are generated by the feedback control device 240 that may be used to control the speed of the motor 228 as indicated by dashed line labeled S in FIG. 3. Note that the rotational commands are not used to provide feedback to a brushless motor for the purposes of commutation. Note that the above example of FIG. 3 regards the situation where command signals are sent to a motor that is coupled to a shaft. The present invention can be applied to any shafted rotational device for which rotational data is required. For example, the motor 228 may be absent and the command signals from control device 240 may regard controlling the position (represented by the dashed lines labeled P in FIG. 3) of platens on printers or machining elements on lathes and mills, for example, or any other application for which this type of electrical signal is required.

To take into account the known circuitry of comparison unit 232 while disregarding data circuitry, the scale 208 and its graduation tracks 210, 212 and 214 are designed in such a way to take advantage of the known circuit in order that the data channel output signals A and B produce the standard quadrature signals for low counts per rotation (below 250 counts per rotation). In particular, the graduation tracks 210, 212 and 214 are positioned such that at any one time at least one, but never three, of the graduation tracks will transmit light to the scanning unit 216.

Figure 4:
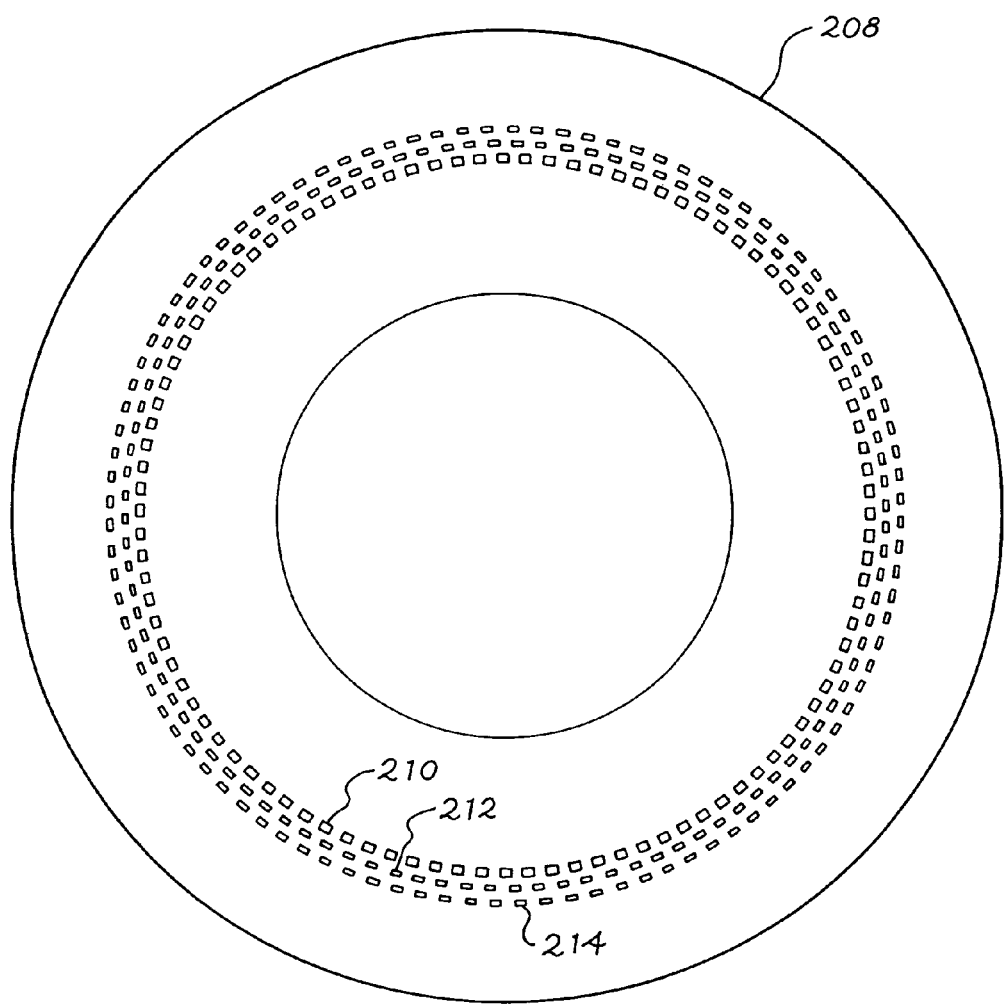
FIG. 4 schematically shows an embodiment of a scale to be used with the position measuring device of FIG. 2 in accordance with the present invention.
Figure 5:
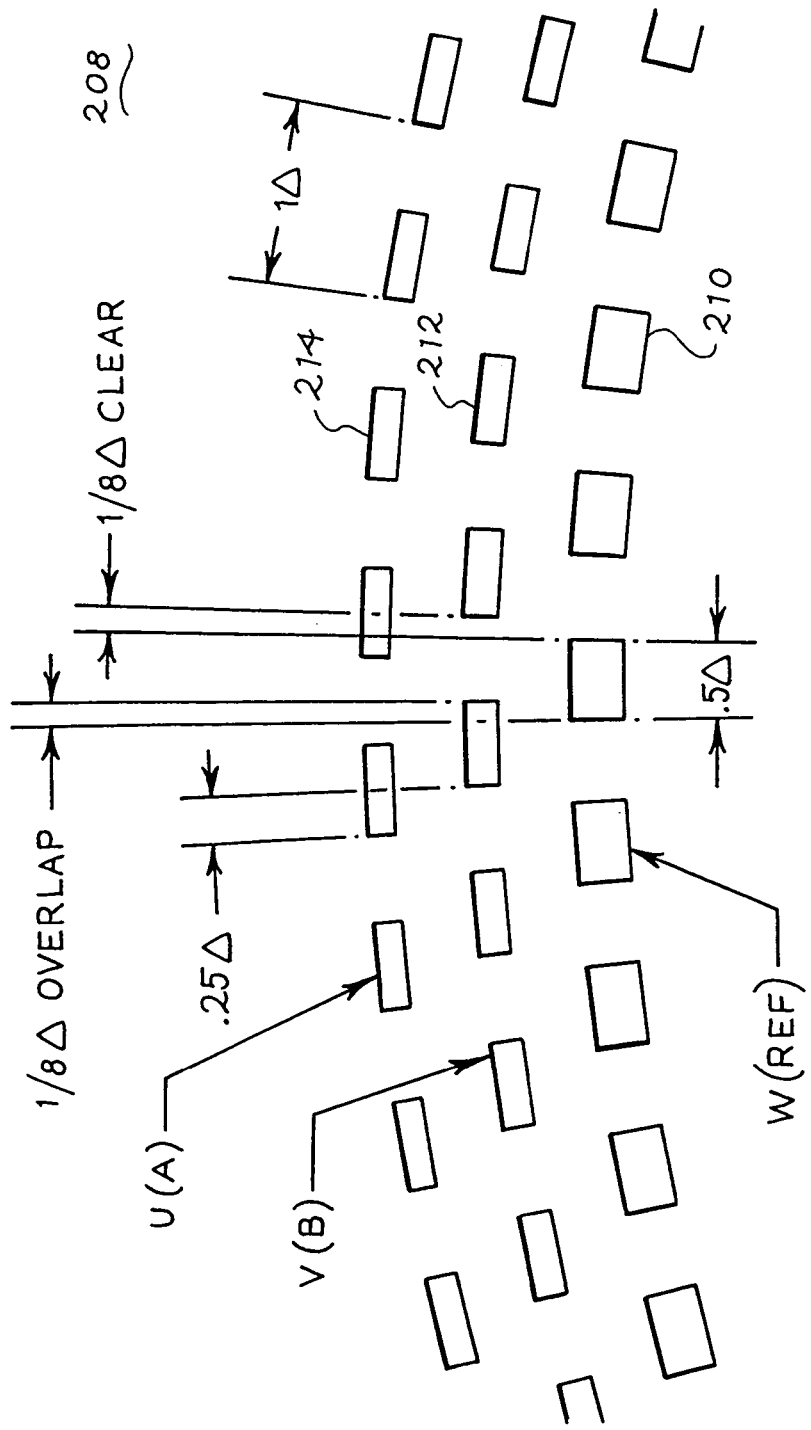
FIG. 5 schematically shows an enlarged portion of the scale of FIG. 4 to be used with the position measuring device of FIG. 2 in accordance with the present invention.

One example of a possible scale is shown in FIGS. 4 and 5. The dimensions and positions of the graduation tracks 210, 212 and 214 are proportional to a factor Δ that is defined by the equation Δ=(360°/rotation)/(N counts/rotation), wherein N is the number of counts per rotation to be detected by the encoder. With the above understanding in mind, each of the graduation tracks 210, 212 and 214 has a period between consecutive graduation tracks of Δ. Each of the graduation tracks 210, 212 and 214 has a radial length of 0.5Δ so that the graduation tracks and their intervening spaces are symmetrical with one another. In addition, the graduation tracks 212 and 214 are offset from one another by 0.25Δ. As shown in FIG. 5, the left and right ends of the graduation tracks 210 overlap the right ends of the graduation tracks 212 and the left ends of the graduation tracks 214 by 0.125Δ, respectively. In addition, the left ends of the graduation tracks 210 are offset from the left ends of the graduation tracks 212 and 214 by the amounts of 0.375Δ and 0.625Δ, respectively. Furthermore, at any one end of the graduation track 210, one of the graduation tracks 212 and 214 will be overlapped by 0.125Δ while the other graduation tack will be clear by 0.125Δ. The result is that a middle portion of each graduation track 210 having a width 0.25Δ is not overlapped by either a graduation track 212 or a graduation track 214. Note that the amount of overlap and clearance of any one end of the graduation track 210 with respect to the other graduation tracks 212, 214 can have a value that is above or below 0.125Δ. However, selection of a 0.125Δ overlap/clearance allows for the best performance and least possibility of crosstalk.

In summary, the present invention allows for known circuitry and detection schemes, such as those disclosed in U.S. Pat. No. 5,936,236, to be used for a low-count rotary encoder that generates quadrature signals. Since the known circuitry and detection schemes generated commutation signals and not quadrature signals, the present invention recognizes that a scale with three tracks can be designed in such a way that when it is used in conjunction with the above-mentioned known circuitry and detection schemes to generate low count quadrature signals. In particular, in one embodiment a reference track is designed to generate such low count quadrature signals. With such a reference track, the position measuring device of FIG. 1 can be retrofitted with the scale 208 instead of scale 14 so that the position measuring device is converted into a device that generates quadrature signals instead of commutation signals. The advantage of the present invention is that there is a saving in construction cost and time of a low-count rotary encoder since readily available circuitry and detection schemes can be used. Thus, there is no need to redesign the circuitry and detection scheme.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

I claim:

1. A position encoder comprising:
   a scale comprising:
      a first graduation track comprising a first set of markings that are periodically arranged with a defined graduation period $\Delta$, wherein $\Delta=(360°/\text{rotation})/(N \text{ counts/rotation})$, wherein N is the number of counts per rotation to be detected by said position encoder;
      a second graduation track comprising a second set of markings that are periodically arranged with a defined graduation period $\Delta$, wherein said second graduation track is shifted relative to said first graduation track by a distance $\Delta/4$; and
      a third graduation track comprising a third set of markings that are periodically arranged with a defined graduation period $\Delta$, wherein said first, second and third graduation tracks are positioned such that at any one time at least one, but never three, of said first, second and third graduation tracks will transmit light directed upon said scale;
   a scanning unit that is displaced relative to said scale, said scanning unit comprising:
      a first sensor that scans said first graduation track and generates a first scanning signal;
      a second sensor that scans said second graduation track and generates a second scanning signal; and
      a third sensor that scans said third graduation track and generates a third scanning signal;
   a circuit that generates quadrature signals based on said first and second scanning signals.

2. The position encoder of claim 1, wherein each of said first, second and third set of markings has a radial length of $0.5\Delta$.

3. The position encoder of claim 1, wherein N is below 250.

4. The position encoder of claim 1, wherein said third graduation track is shifted with respect to said first track by a distance $5\Delta/8$ and is shifted with respect to said second graduation track by a distance $3\Delta/8$.

5. The position encoder of claim 1, further comprising a light source that generates light that is transmitted through said first, second and third graduation tracks onto said first, second and third sensors.

6. The position encoder of claim 1, wherein said first, second and third sensors from portions of an Opto ASIC.

7. The position encoder of claim 1, wherein said scale is coupled to a motor via a shaft.

8. The position encoder of claim 7, wherein N is below 250.

9. The position encoder of claim 1, wherein said circuit comprises:
   a first comparator unit that is coupled to said first sensor and receives said first scanning signal;
   a second comparator unit that is coupled to said second sensor and receives said second scanning signal;
   a third comparator unit that is coupled to said third sensor and receives said third scanning signal;
   wherein said first, second and third comparator units each receive a reference signal and generate said quadrature signals.

10. The position encoder of claim 9, wherein said reference signal that is a combination of said first, second and third scanning signals.

11. The position encoder of claim 10, wherein said reference signal is an average of said first, second and third scanning signals.

12. The position encoder of claim 10, wherein said reference signal is always less than any of said first, second or third scanning signals.

13. A scale for a position encoder comprising:
   a first graduation track comprising a first set of markings that are periodically arranged with a defined graduation period $\Delta$, wherein $\Delta=(360°/\text{rotation})/(N \text{ counts/rotation})$, wherein N is the number of counts per rotation to be detected by said position encoder;
   a second graduation track comprising a second set of markings that are periodically arranged with a defined graduation period $\Delta$, wherein said second graduation track is shifted relative to said first graduation track by a distance $\Delta/4$; and
   a third graduation track comprising a third set of markings that are periodically arranged with a defined graduation period $\Delta$, wherein said first, second and third graduation tracks are positioned such that at any one time at least one, but never three, of said first, second and third graduation tracks will transmit light directed upon said scale.

14. The scale of claim 13, wherein each of said first, second and third set of markings has a radial length of $0.5\Delta$.

15. The scale of claim 13, wherein N is below 250.

16. The scale of claim 13, wherein said third graduation track is shifted with respect to said first track by a distance $5\Delta/8$ and is shifted with respect to said second graduation track by a distance $3\Delta/8$.

17. The position encoder of claim 13, wherein each of said first, second and third set of markings has a radial length of $0.5\Delta$.

* * * * *